US009563351B2

(12) United States Patent
Migos et al.

(10) Patent No.: US 9,563,351 B2
(45) Date of Patent: Feb. 7, 2017

(54) DEVICE, METHOD, AND GRAPHICAL USER INTERFACE FOR NAVIGATING BETWEEN DOCUMENT SECTIONS

(75) Inventors: Charles J. Migos, San Bruno, CA (US); Jay Christopher Capela, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 1168 days.

(21) Appl. No.: 13/077,869

(22) Filed: Mar. 31, 2011

(65) Prior Publication Data

US 2012/0240074 A1    Sep. 20, 2012

Related U.S. Application Data

(60) Provisional application No. 61/452,623, filed on Mar. 14, 2011.

(51) Int. Cl.
  *G06F 3/0488* (2013.01)
  *G06F 3/0483* (2013.01)
  *G06F 3/0485* (2013.01)

(52) U.S. Cl.
  CPC ......... *G06F 3/04883* (2013.01); *G06F 3/0483* (2013.01); *G06F 3/04855* (2013.01)

(58) Field of Classification Search
  CPC ... G06F 3/0483; G06F 3/04883; G06F 3/0488
  USPC ........................................................ 715/776
  See application file for complete search history.

(56) References Cited

U.S. PATENT DOCUMENTS

| 7,757,184 | B2 * | 7/2010 | Martin et al. ................. 715/810 |
| 7,865,817 | B2 * | 1/2011 | Ryan et al. .................... 715/232 |
| 8,347,232 | B1 * | 1/2013 | Prud'Hommeaux et al. .............................. 715/833 |
| 8,504,624 | B2 * | 8/2013 | Gormish et al. .............. 709/206 |
| 8,543,904 | B1 * | 9/2013 | Karls et al. .................... 715/221 |
| 8,589,823 | B2 * | 11/2013 | Lemay et al. ................. 715/854 |
| 2007/0143706 | A1 * | 6/2007 | Peters ........................... 715/786 |
| 2007/0256031 | A1 * | 11/2007 | Martin et al. ................. 715/854 |
| 2008/0163039 | A1 * | 7/2008 | Ryan et al. .................... 715/206 |
| 2010/0114857 | A1 * | 5/2010 | Edwards et al. .............. 707/709 |
| 2011/0107216 | A1 * | 5/2011 | Bi .................................. 715/716 |
| 2012/0023462 | A1 * | 1/2012 | Rosing et al. ................ 715/863 |

(Continued)

OTHER PUBLICATIONS

Vimeo, "Smart Design magazine UX concept," vimeo.com, 2010, http://vimeo.com/10813230, 2 pages.

(Continued)

*Primary Examiner* — David Choi
(74) *Attorney, Agent, or Firm* — Morrison & Foerster LLP

(57) ABSTRACT

An electronic device with a display and a touch-sensitive surface displays a page of a first multi-page section of a document and a navigation bar configured to navigate through only pages in the first multi-page section of the document. The device detects a predefined gesture at a location on the touch-sensitive surface that corresponds to a predefined portion of the navigation bar. In response to detecting the predefined gesture, the device displays a navigation user interface that enables selection of a page of the document that is outside of the first multi-page section. The device receives an input in the navigation user interface that indicates selection of a page of a second multi-page section of the document outside of the first multi-page section. In response to receiving the input, the device displays the selected page of the second multi-page section of the document.

13 Claims, 14 Drawing Sheets

(56) References Cited

U.S. PATENT DOCUMENTS

| | | |
|---|---|---|
| 2012/0159294 A1* | 6/2012 | Gonsalves et al. ........... 715/205 |
| 2012/0166959 A1* | 6/2012 | Hilerio et al. ................ 715/738 |
| 2012/0233482 A1* | 9/2012 | Piersol et al. ................ 713/323 |
| 2012/0240074 A1* | 9/2012 | Migos et al. ................. 715/776 |

OTHER PUBLICATIONS

Wikipedia, "iBooks," Wikipedia, the Free Encyclopedia, updated Jan. 21, 2014, http://en.wikipedia.org/wiki/Ibooks, 5 pages.

* cited by examiner

DEVICE, METHOD, AND GRAPHICAL USER INTERFACE FOR NAVIGATING BETWEEN DOCUMENT SECTIONS

RELATED APPLICATIONS

This application claims priority to U.S. Provisional Application Ser. No. 61/452,623, filed Mar. 14, 2011, entitled "Device, Method, and Graphical User Interface for Navigating Between Document Sections," which is incorporated by reference herein in its entirety.

TECHNICAL FIELD

This relates generally to electronic devices with touch-sensitive surfaces, including but not limited to electronic devices with touch-sensitive surfaces that navigate between sections of a document.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include navigating between sections (e.g., chapters, lessons, etc.) of a document. A user may need to perform such manipulations in an electronic book or document reader application or in a digital publication application, for example.

But existing methods for navigating between document sections are cumbersome and inefficient, particularly when navigating in response to imprecise finger gestures on a touch-sensitive surface. In addition, existing methods take longer than necessary, thereby wasting energy. This latter consideration is particularly important in battery-operated devices.

SUMMARY

Accordingly, there is a need for electronic devices with faster, more efficient methods and interfaces for navigating between document sections. Such methods and interfaces may complement or replace conventional methods for navigating between document sections. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a method is performed at an electronic device having a display and a touch-sensitive surface. The method includes displaying a page of a first multi-page section of a document and a navigation bar configured to navigate through only pages in the first multi-page section of the document; detecting a predefined gesture at a location on the touch-sensitive surface that corresponds to a predefined portion of the navigation bar; in response to detecting the predefined gesture, displaying a navigation user interface that enables selection of a page of the document that is outside of the first multi-page section; receiving an input in the navigation user interface that indicates selection of a page of a second multi-page section of the document outside of the first multi-page section; and in response to receiving the input, displaying the selected page of the second multi-page section of the document.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of the method described above. In accordance with some embodiments, a graphical user interface on an electronic device with a display, a touch-sensitive surface, a memory, and one or more processors to execute one or more programs stored in the memory includes one or more of the elements displayed in the method described above, which are updated in response to inputs, as described in the method above. In accordance with some embodiments, a computer readable storage medium has stored therein instructions which when executed by an electronic device with a display and a touch-sensitive surface, cause the device to perform the operations of the method described above. In accordance with some embodiments, an electronic device includes: a display; a touch-sensitive surface; means for performing the operations of the method described above. In accordance with some embodiments, an information processing apparatus, for use in an electronic device with a display and a touch-sensitive surface, includes means for performing the operations of the method described above.

In accordance with some embodiments, an electronic device includes a display unit configured to display a page of a first multi-page section of a document and a navigation bar configured to navigate through only pages in the first multi-page section of the document; a touch-sensitive surface unit configured to receive user gestures; and a processing unit coupled to the display unit and the touch-sensitive surface unit. The processing unit is configured to: detect a predefined gesture at a location on the touch-sensitive surface unit that corresponds to a predefined portion of the navigation bar; in response to detecting the predefined gesture, enable display of a navigation user interface that enables selection of a page of the document that is outside of the first multi-page section; receive an input in the navigation user interface that indicates selection of a page of a second multi-page section of the document outside of the first multi-page section; and in response to receiving the input, enable display of the selected page of the second multi-page section of the document.

Thus, electronic devices with displays and touch-sensitive surfaces are provided with faster, more efficient methods and interfaces for navigating between document sections, thereby increasing the effectiveness, efficiency, and user satisfaction with such devices. Such methods and interfaces may complement or replace conventional methods for navigating between document sections.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
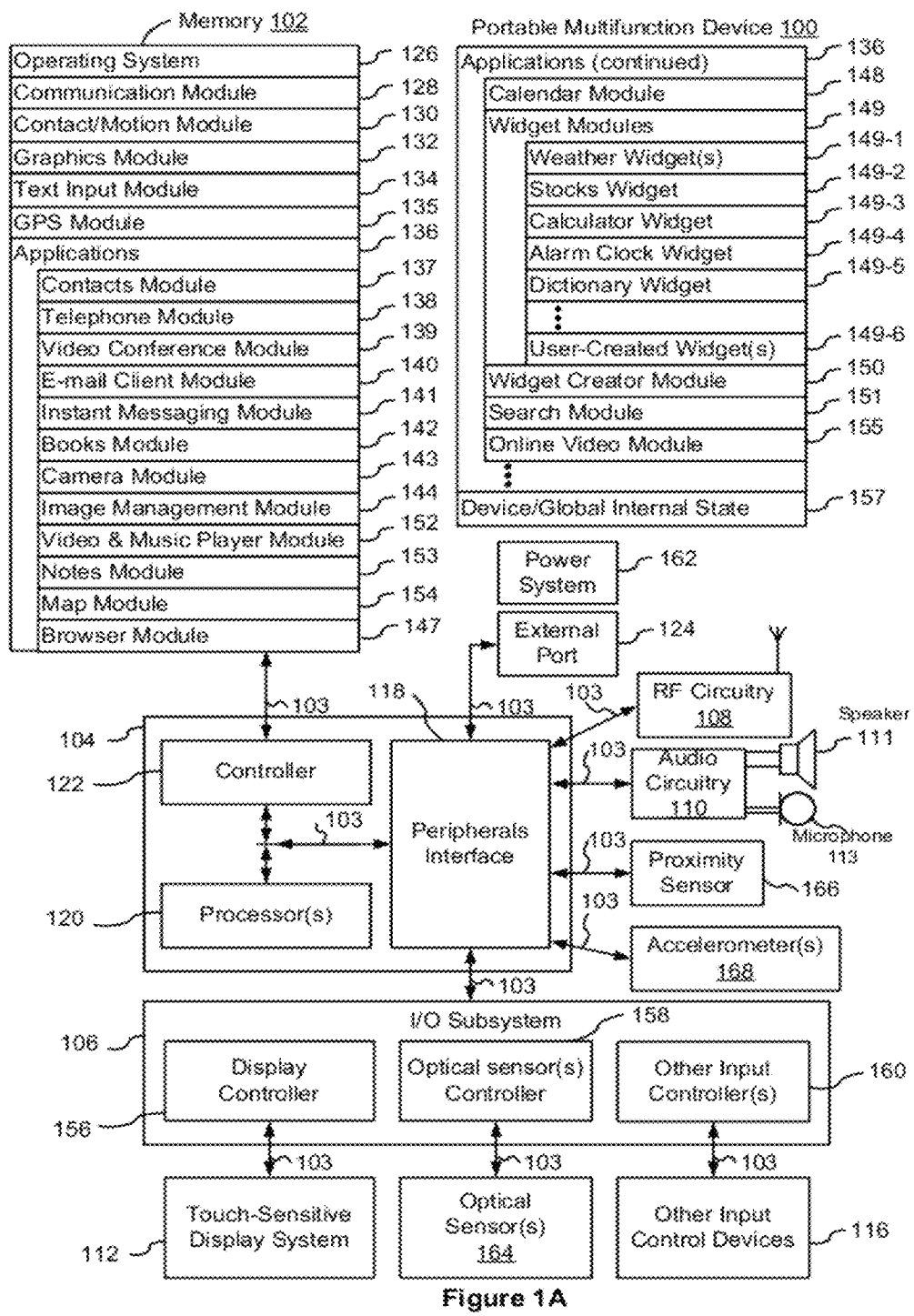
FIG. 1A is a block diagram illustrating a portable multifunction device with a touch-sensitive display in accordance with some embodiments.

Described below are devices and methods that enable a user to navigate between sections of a multi-section document.

The device displays a navigation bar that enables the user to navigate just within a currently displayed section of a multi-section document, such as a currently displayed chapter in a book. This single-section navigation bar allows a user to more precisely and easily navigate within the currently displayed section than a navigation bar that enables navigation within the entire document (which may contain hundreds of pages). The single-section navigation bar is particularly advantageous when imprecise finger gestures (rather than a mouse and cursor) are being used to manipulate the navigation bar. But the device still enables the user to easily navigate beyond the currently displayed section of the document. When the user performs a predefined gesture on a predefined portion of the single-section navigation bar, a navigation interface that enables the user to navigate to other sections of the document is displayed. The user may use the navigation interface to quickly jump to another section of the document. Having a single-section navigation bar for navigating within a section and another user interface for navigating between sections allows the user to quickly and accurately navigate within a current section and yet still able to navigate to another section when desired.

Below, FIGS. 1A-1B, 2, 3, and 7 provide a description of exemplary devices. FIGS. 4A-4B and 5A-5E illustrate exemplary user interfaces for navigating between document sections. FIGS. 6A-6B are flow diagrams illustrating a method of navigating between document sections. The user interfaces in FIGS. 5A-5E are used to illustrate the processes in FIGS. 6A-6B.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for video-conferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
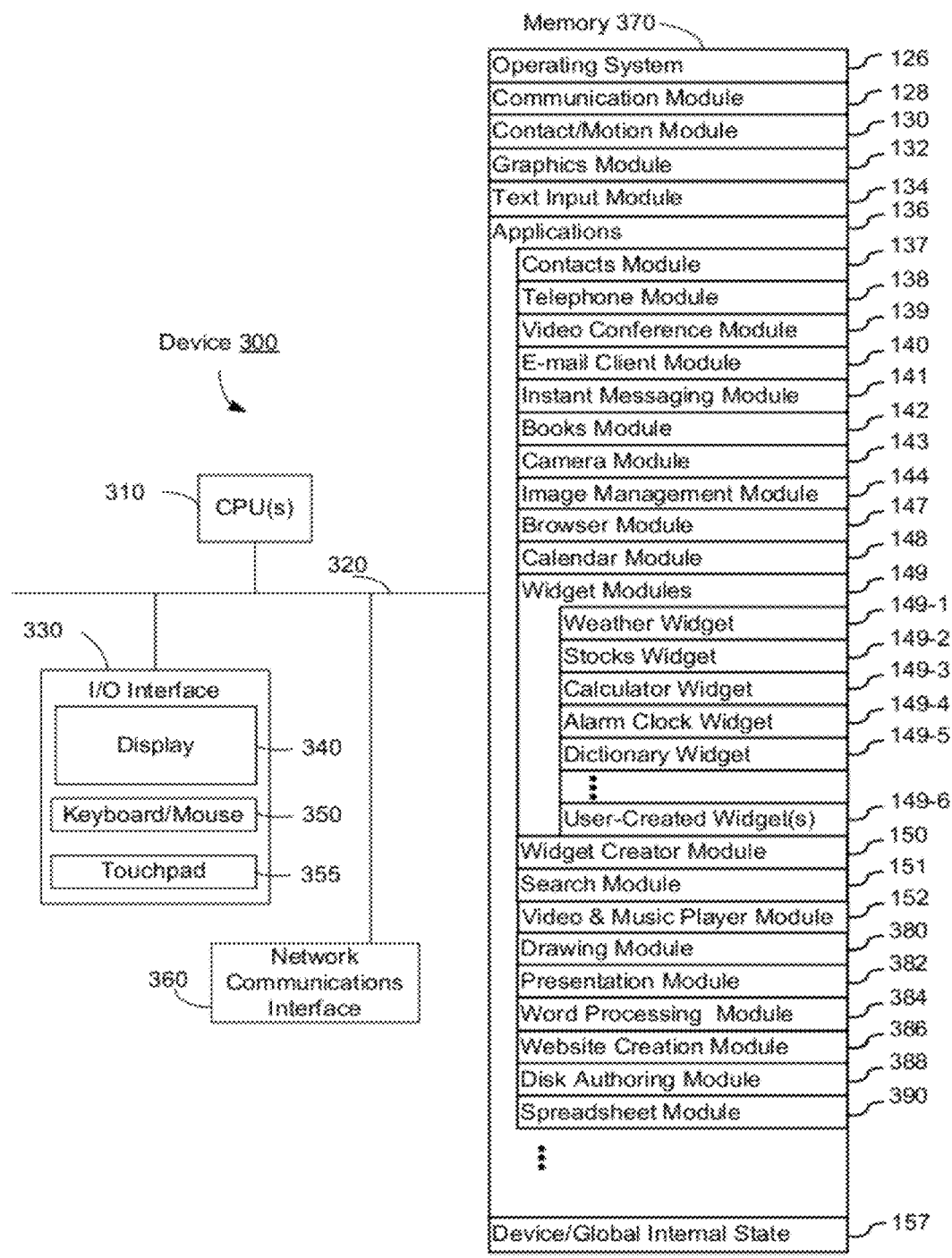
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- books module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, books module 142 includes executable instructions to display, annotate, and share an electronic book (e.g., a text book), magazine, newspaper or other digital publication between a user and one or more other participants in accordance with user instructions.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
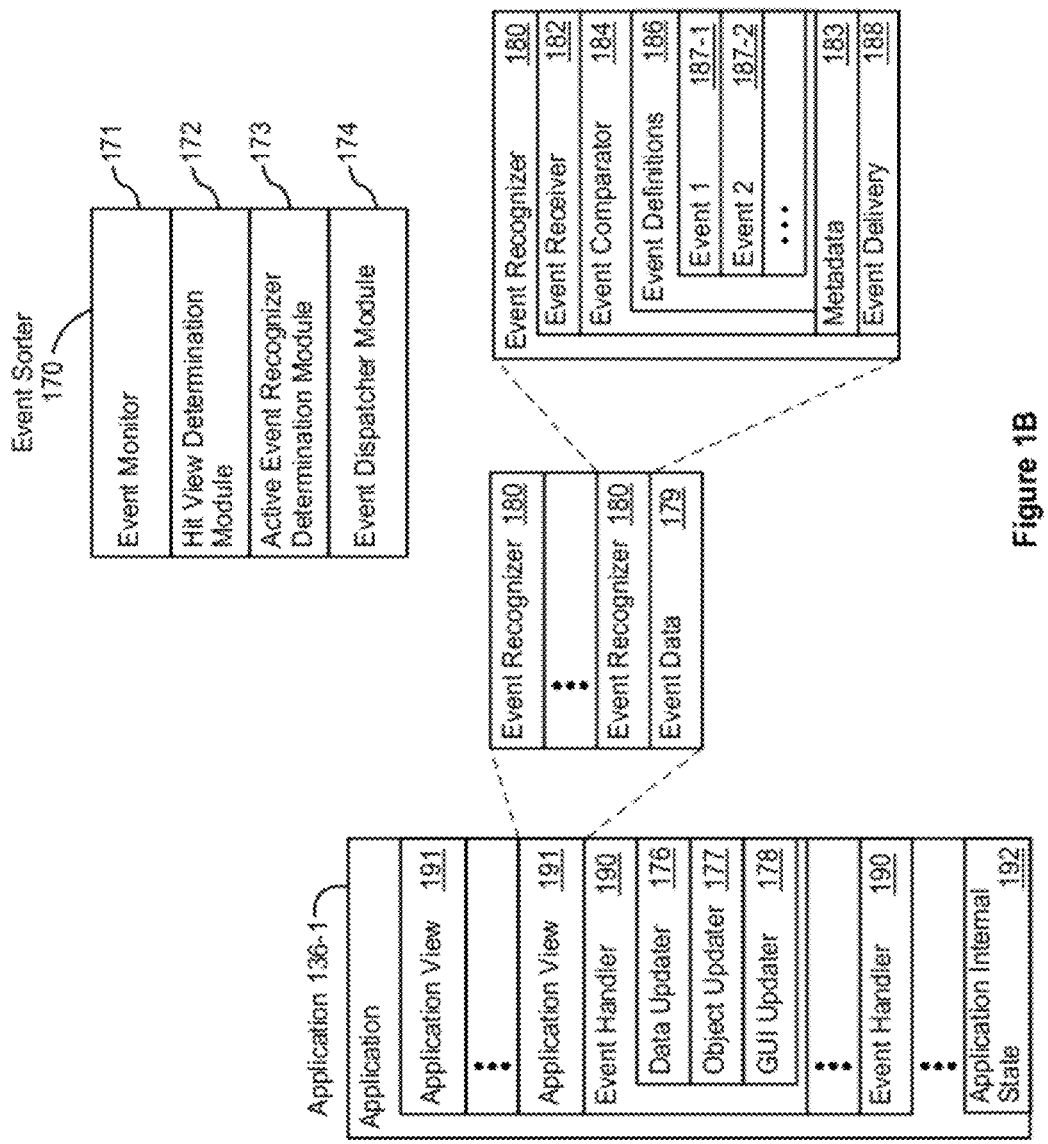
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
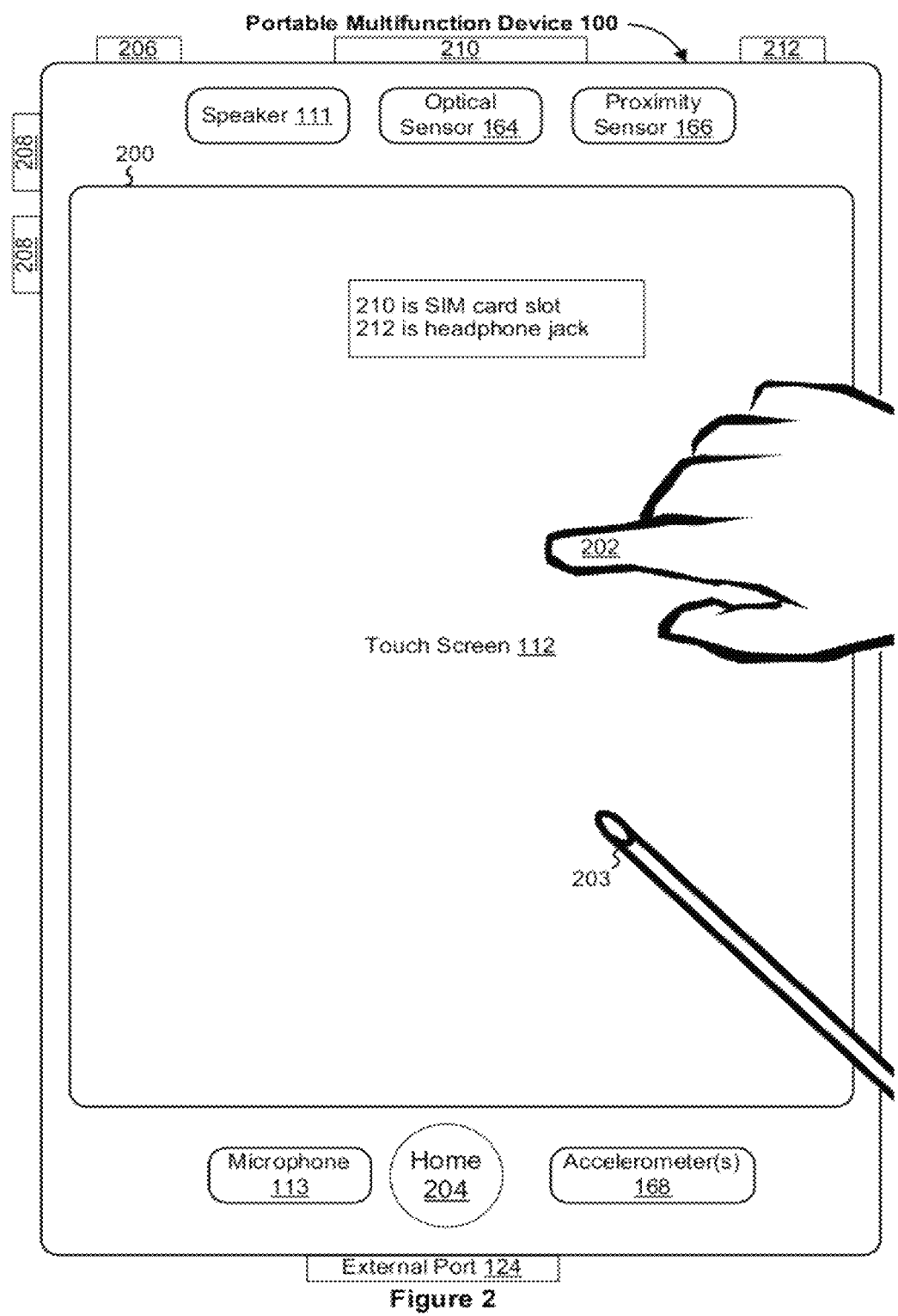
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
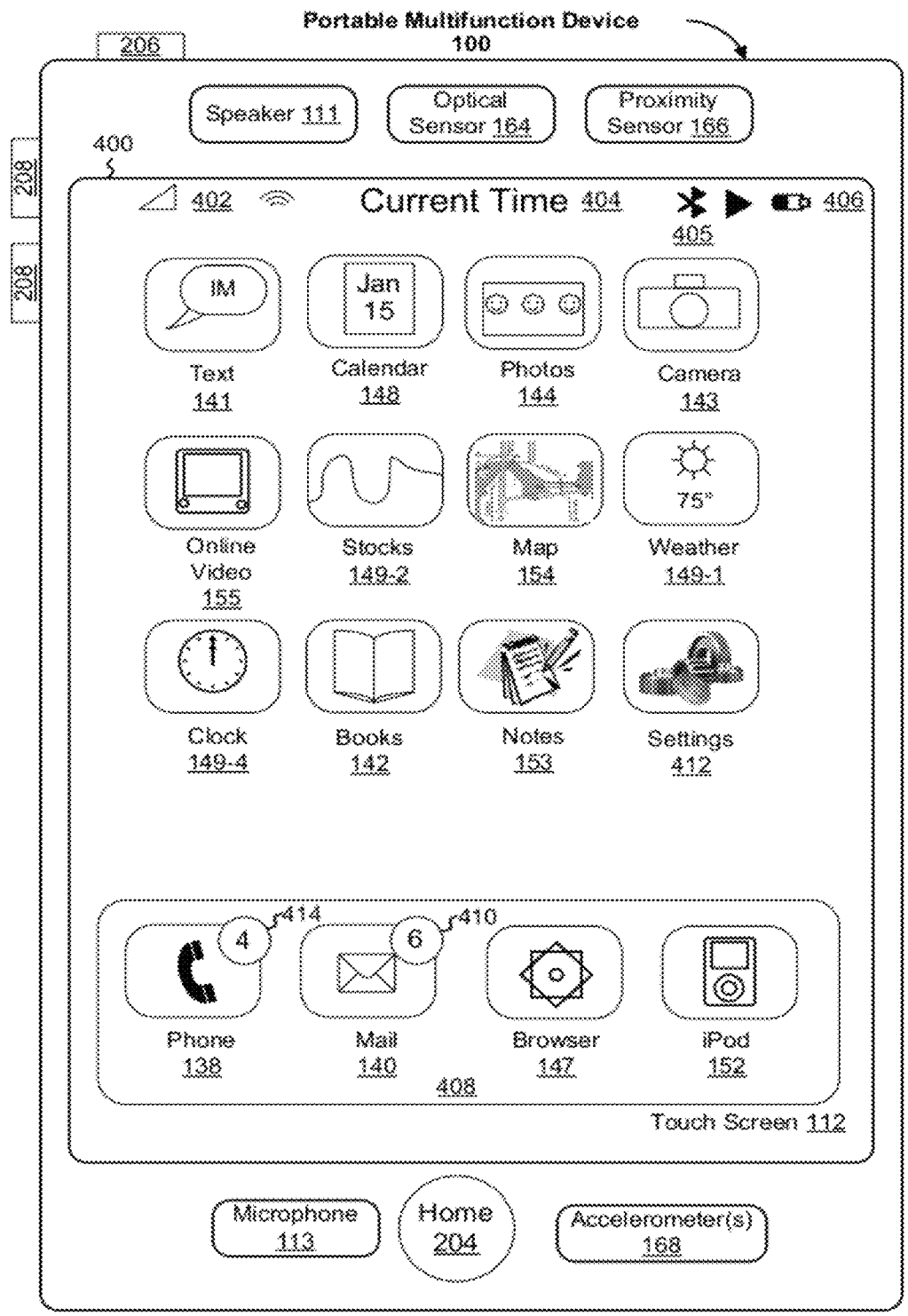
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Video and music player 152, also referred to as iPod (trademark of Apple Inc.) module 152; and
- Icons for other applications, such as:
  - IM 141;
  - Image management 144;
  - Camera 143;
  - Weather 149-1;
  - Stocks 149-2;
  - Books 142;
  - Calendar 148;
  - Alarm clock 149-4;
  - Map 154;
  - Notes 153;
  - Settings 412, which provides access to settings for device 100 and its various applications 136; and
  - Online video module 155, also referred to as YouTube (trademark of Google Inc.) module 155.

Figure 4B:
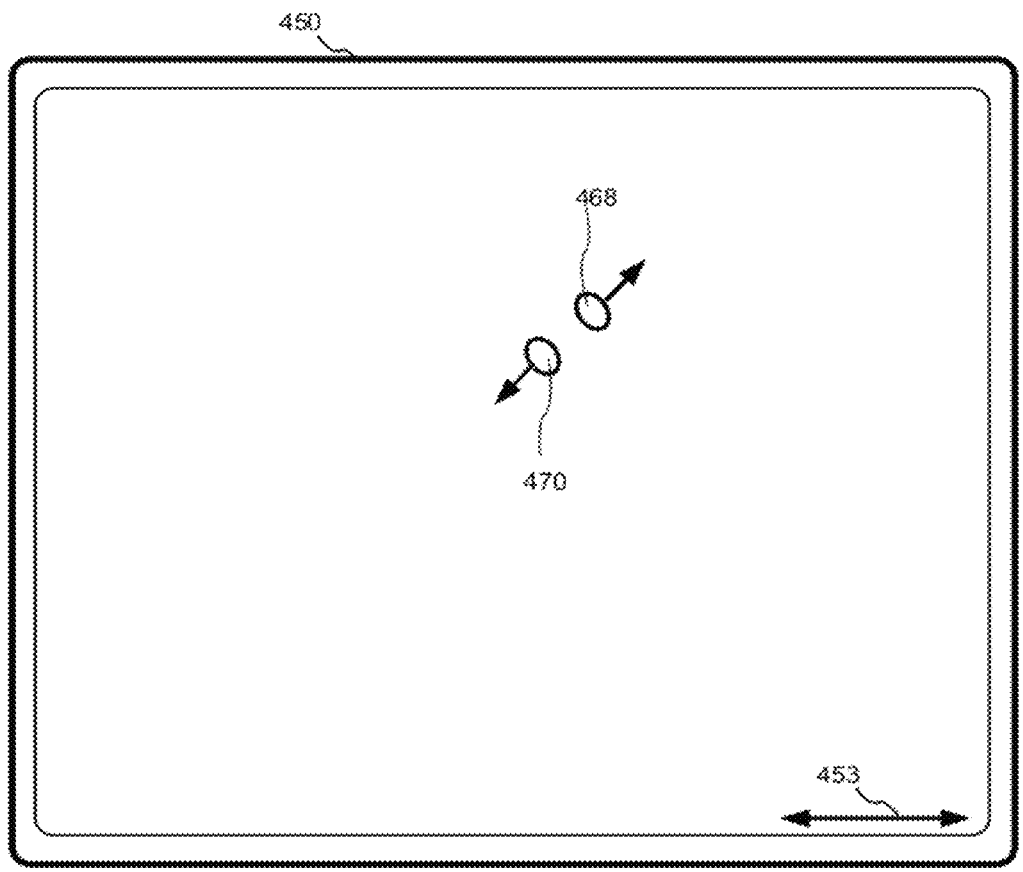
FIG. 4B illustrates an exemplary user interface for a multifunction device with a touch-sensitive surface that is separate from the display in accordance with some embodiments.
Figure 4B:
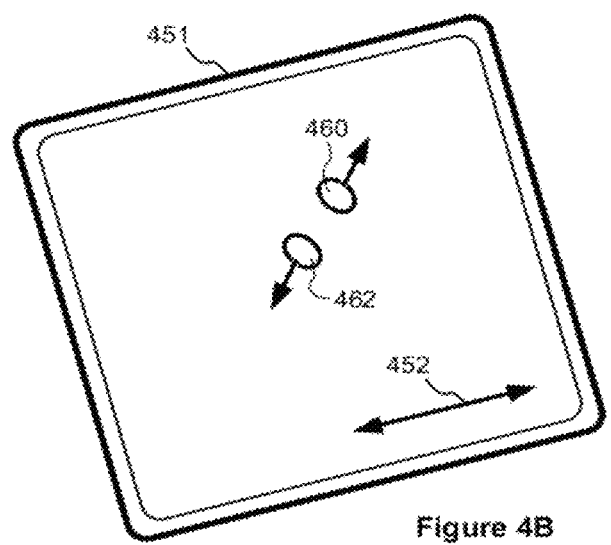

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5E illustrate exemplary user interfaces for navigating between document sections in accordance with some embodiments. The user interfaces in these figures are used to illustrate the processes described below, including the processes in FIGS. 6A-6B.

Figure 5A:
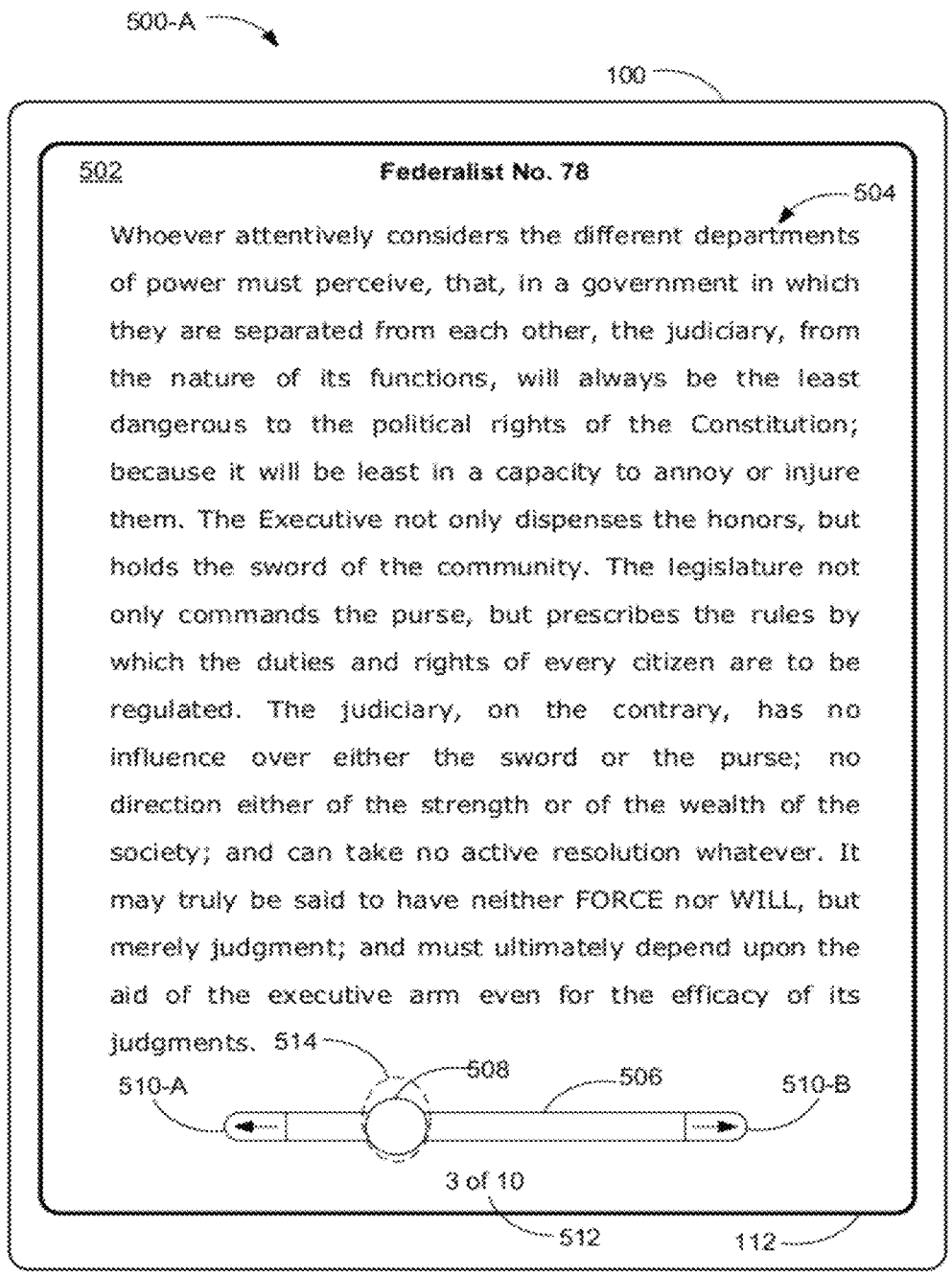
FIGS. 5A-5E illustrate exemplary user interfaces for navigating between document sections in accordance with some embodiments.
Figure 6A:
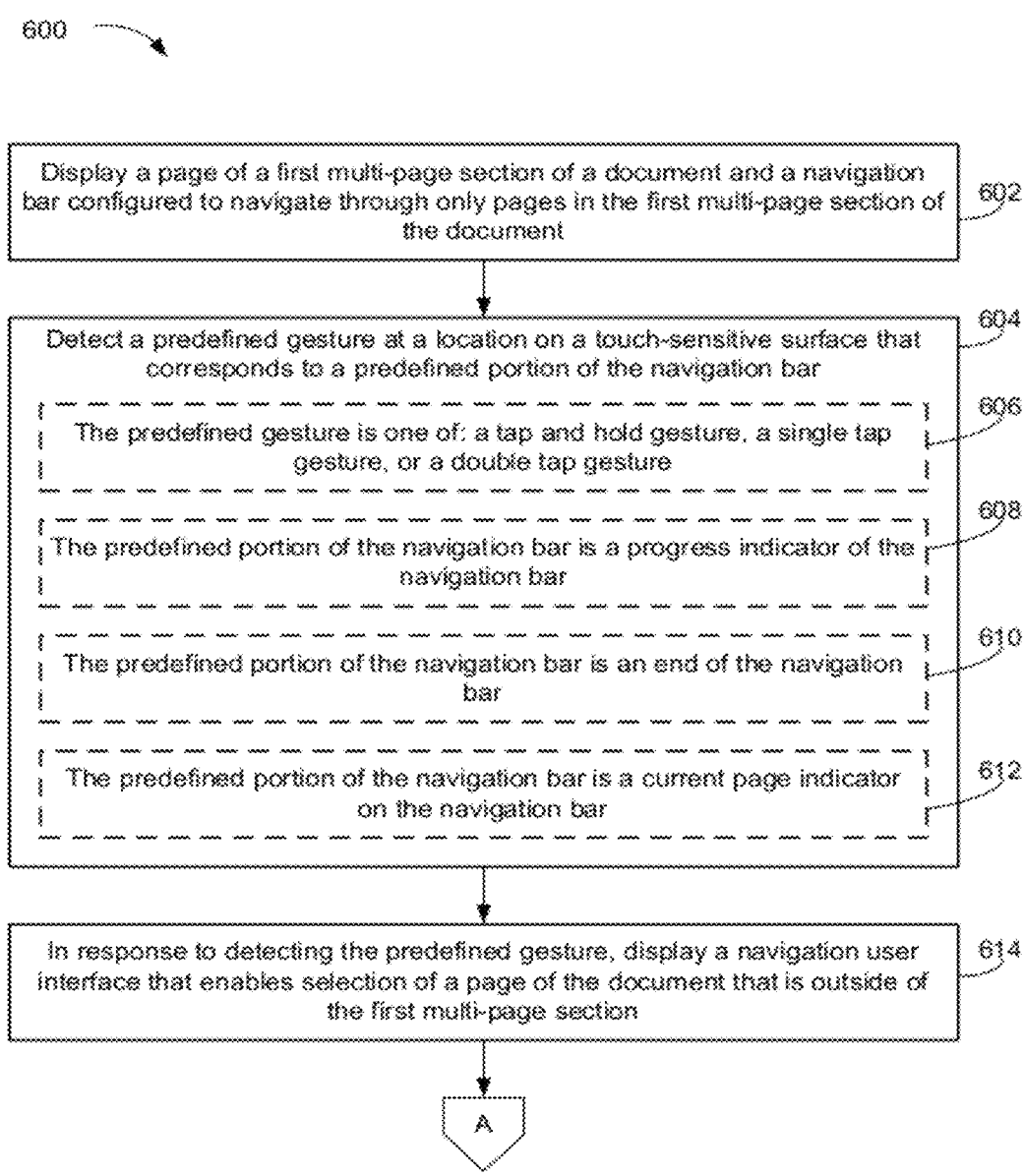
FIGS. 6A-6B are flow diagrams illustrating a method of navigating between document sections in accordance with some embodiments.
Figure 6B:
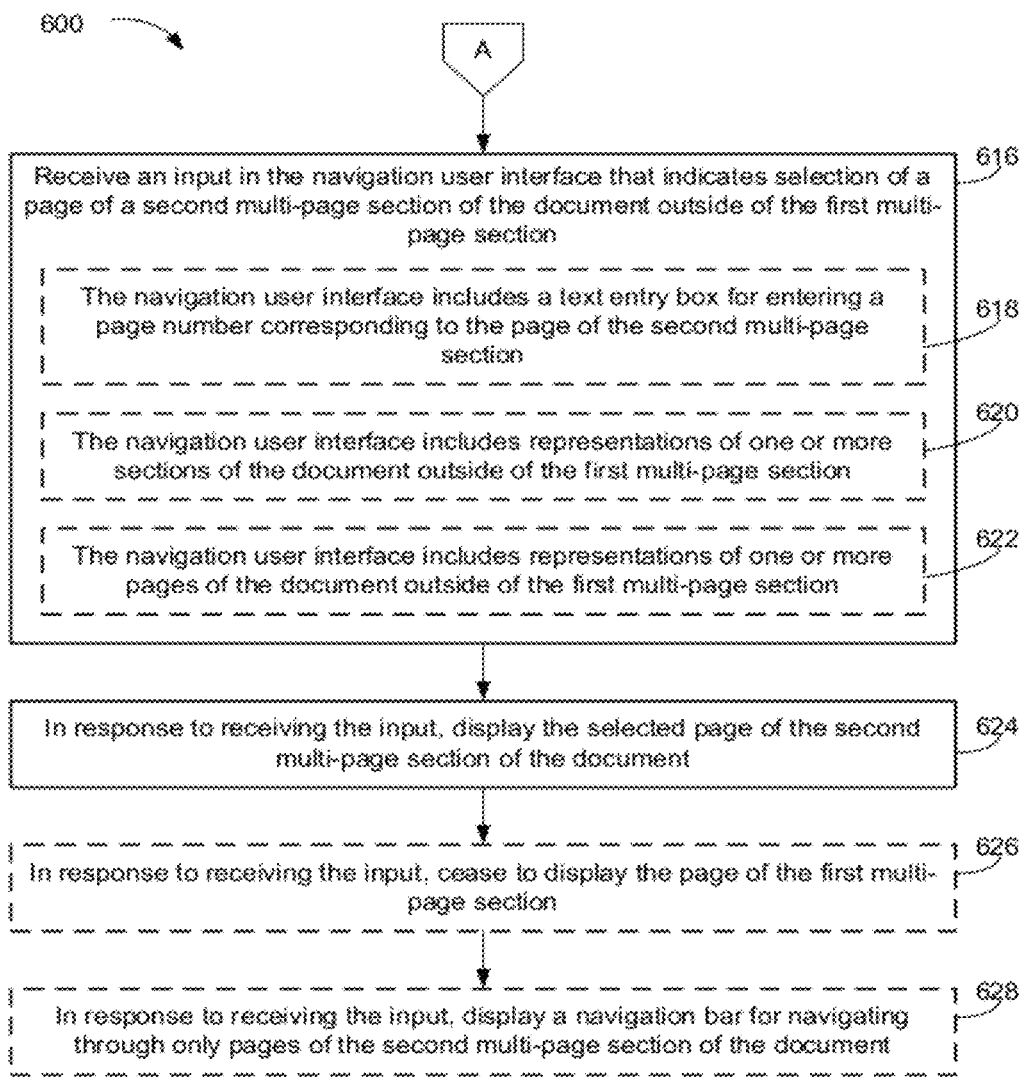

FIG. 5A illustrates user interface ("UI") 500-A. UI 500-A includes a page (e.g., page 504) of multi-page electronic document 502 (e.g., an electronic textbook, electronic book, electronic magazine, a Portable Document Format (PDF) document, word processing document, webpage, spreadsheet, desktop publishing document, slideshow document, drawing document, etc.) displayed on touch-sensitive display 112 of device 100. Electronic document 502 includes content, such as text and graphical content (e.g., photos, charts, graphs, figures, images, etc.). Electronic document 502 includes a plurality of sections (e.g., chapters, lessons, acts, articles, or other logical divisions of the document), with each section including one or more pages of document 502. In the description below and in the figures, the example used as document 502 is the Federalist Papers, and the sections of document 502 are individual articles of the Federalist Papers (i.e., Federalist No. 1 is a section, Federalist No. 2 is another section, Federalist No. 3 is yet another section, etc.). In FIG. 5A, page 504 includes text from a section (Federalist No. 78) of document 502 (the Federalist Papers).

Also displayed on touch-sensitive display 112 is a navigation bar that includes progress bar 506 and scrubber 508 for navigating between pages of the section (Federalist No. 78) corresponding to the currently displayed page (page 504) of document 502. Progress bar 506 indicates the place of page 504 among pages in the current section (i.e., the section in which the currently displayed page belongs) and indicates the user's reading progress. When scrubber 508 is dragged along progress bar 506 (e.g., by a drag gesture detected on scrubber 508 and moving along progress bar 506), device 100 navigates between pages within the current section in accordance with the position of scrubber 508 along progress bar 506. Tapping on progress bar 506 (e.g., with a tap gesture) at a location other than the location of scrubber 508 causes device 100 to navigate to a page within the current section corresponding to the location on progress bar 506 that corresponds to a location of the tap gesture; scrubber 508 moves to the location on progress bar 506 corresponding to the location of the tap gesture. In some embodiments, progress bar 506 also includes end icons 510-A and 510-B. A tap gesture on end icon 510-A or 510-B causes device 100 to navigate backward or forward, respectively, between pages within the current section by a predefined amount. For example, each detected tap on end icon 510-B causes device 100 to navigate forward within the current section by one page. In some embodiments, progress bar 506, scrubber 508, and end icons 510 enable navigation between pages only within the current section of document 502.

In some embodiments, also displayed is page count indicator 512. Page count indicator 512 indicates the current page (either within the current section or within the entire document) and optionally the total number of pages within the current section or the entire document.

Figure 5B:
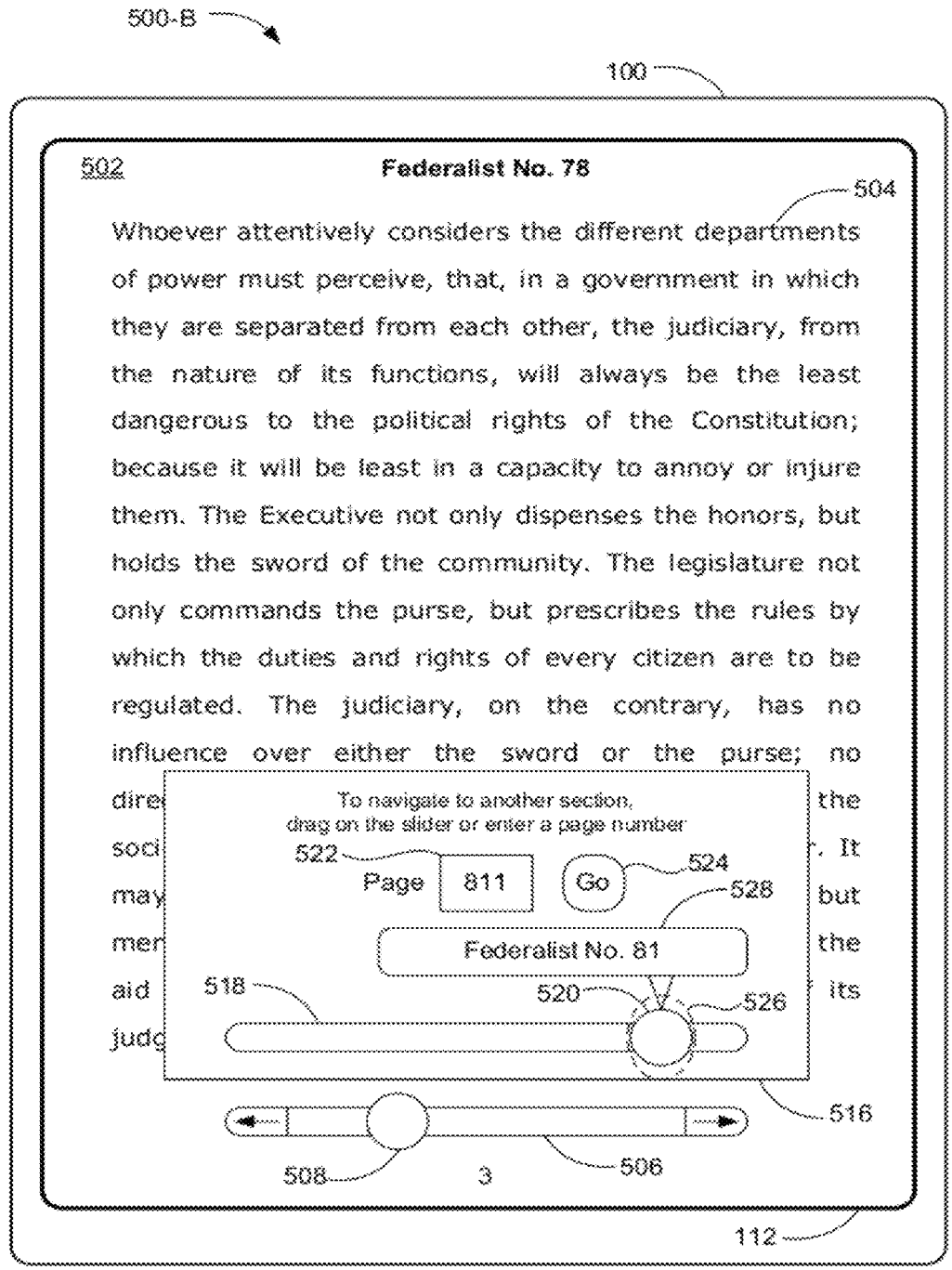

FIG. 5A shows gesture 514 being detected on scrubber 508. Gesture 514 is a different gesture than the drag gesture described above for navigating between pages within the current section using scrubber 508 and is performed at a different location than the tap gestures described above (which occurred at locations other than the scrubber 508). Gesture 514 is a gesture that matches a predefined gesture type (e.g., a tap and hold gesture, a single tap gesture, or a double tap gesture) on a predefined location (e.g., scrubber 508). In response to detection of gesture 514 on scrubber 508, navigation interface 516 is displayed, as shown in FIG. 5B. Detection of the predefined gesture (e.g., gesture 514) at a location other than the predefined location, or detection at the predefined location (e.g., scrubber 508) of a gesture other than the predefined gesture will not activate display of navigation interface 516.

FIG. 5B illustrates UI 500-B. UI 500-B includes navigation interface 516 displayed over text 504 on touch-sensitive display 112. Navigation interface 516 includes multi-section progress bar 518 and scrubber 520 that may be dragged along multi-section progress bar 518. Navigation interface 516 may also include page number field 822 and optionally a "Go" button 824. Navigation interface 516 may include either multi-section progress bar 518 and scrubber 520, or page number field 822, or both.

Drag gesture 526 is detected on scrubber 520 in FIG. 5B. When scrubber 520 is dragged along multi-section progress bar 518, device 100 navigates between multiple sections of document 502 (e.g., within document 502 in its entirety) in accordance with the position of scrubber 520 along progress bar 518. For example, drag gesture 526 is detected on scrubber 520 and moves on touch-sensitive display 112 along multi-section progress bar 518. In response to the detection of movement of drag gesture 526, device 100 navigates to a page (e.g., the first page of the section) in a section corresponding to the position of scrubber 526 on multi-section progress bar 518, where the section corresponding to the scrubber position is one of multiple sections of document 502, which includes the current section and one or more sections other than the current section.

In some embodiments, section information 528, for the section (or a page in the section) corresponding to the position of scrubber 520 on multi-section progress bar 518, is displayed. Section information 528 may include section names (e.g., chapter names, lesson names, etc.) and/or a description of the content in the section. In some other embodiments, section information 528 includes a thumbnail image of a page in the corresponding section.

When page number field 522 is displayed, a page number of a page in any of the multiple sections of the document may be entered into page number field 522 (e.g., via a soft keyboard, not shown). When the page number entered into page number field 522 is submitted (e.g., by performing a gesture on "Go" button 524), device 100 navigates to the page having the entered page number.

Figure 5C:
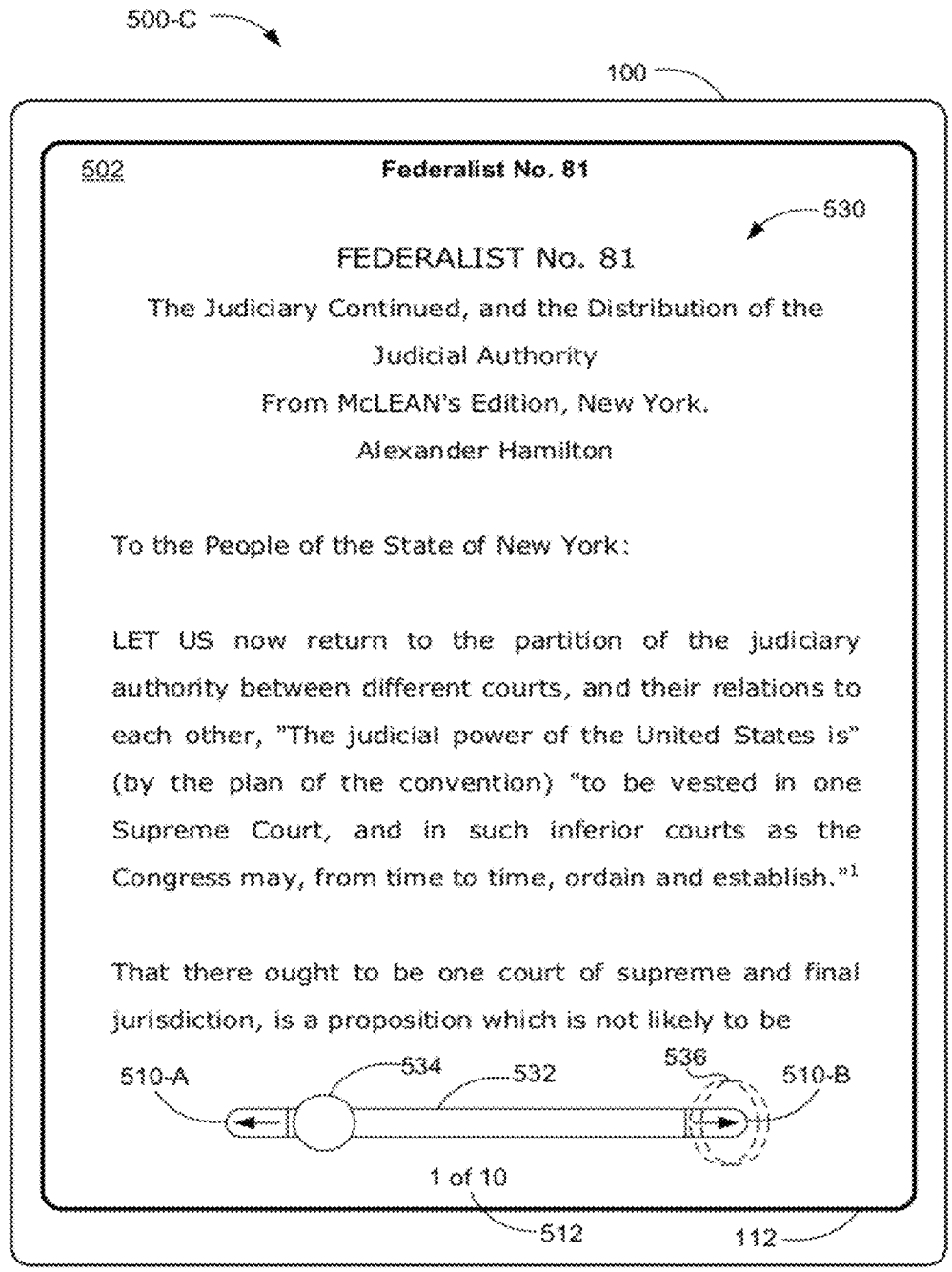

When device 100 navigates to a page as a result of interaction with navigation interface 516, the currently displayed page is typically replaced on touch-sensitive display 112 with the navigated-to page, as shown in FIG. 5C. FIG. 5C illustrates UI 500-C, which includes page 530 of document 502 displayed on touch-sensitive display 112. Page 530 is in a different section (Federalist No. 81) than page 504 (Federalist No. 78). Page 504 ceases to be displayed when page 530 is displayed on touch-sensitive display 112.

Also displayed in UI 500-C is a navigation bar that includes progress bar 532 and scrubber 534. The navigation bar that includes progress bar 532 and scrubber 534 operates in an analogous way, including with respect to detection of predefined gestures on a predefined location, as the navigation bar that includes progress bar 506 and scrubber 508 as described above, with the difference that progress bar 532 and scrubber 534 corresponds to the new current section (Federalist No. 81) associated with page 530. In some embodiments, progress bar 532 also includes end icons 510-A and 510-B for navigating within the current section by a predefined amount.

Figure 5D:
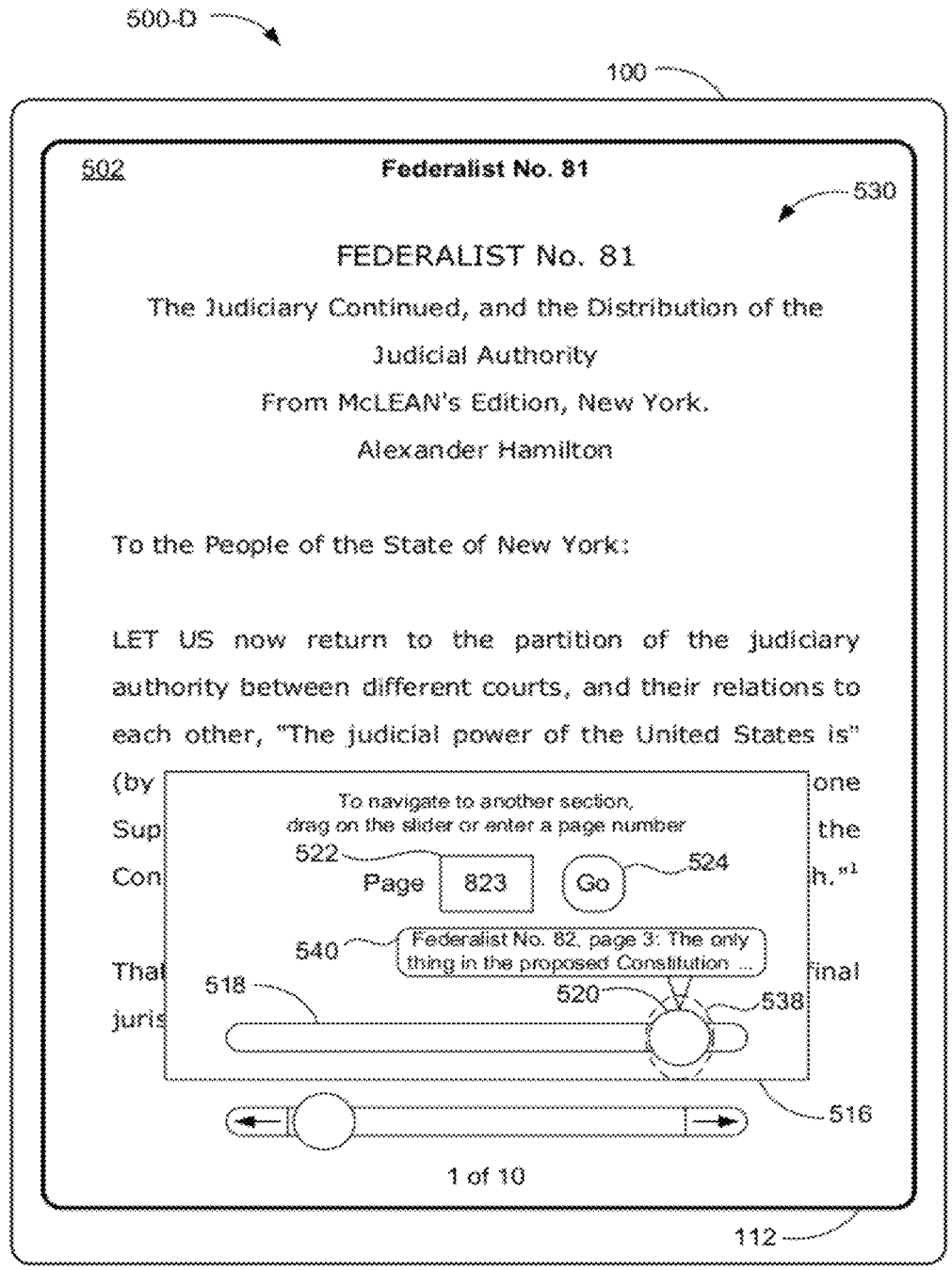

FIG. 5C shows gesture 536 being detected on end icon 510-B. Gesture 536 is a different gesture than a single tap gesture for activating end icon 510-B. For example, gesture 536 is a double tap gesture. Gesture 536 on end icon 510-B is, like gesture 514, another example of a gesture that matches a predefined gesture type on a predefined location (e.g., either end icon 510). In response to detection of gesture 536 on end icon 510-B, navigation interface 516 is displayed, as shown in FIG. 5D. Detection of the predefined gesture (e.g., gesture 536) at a location other than the predefined location, or detection at the predefined location (e.g., end icon 510) of a gesture other than the predefined gesture will not activate display of navigation interface 516.

FIG. 5D illustrates UI 500-D, which includes page 530 and navigation interface 516 displayed on touch-sensitive display 112. Navigation interface 516 includes multi-section progress bar 518, scrubber 520, page number field 522, and "Go" button 524, which are described above.

In some embodiments, page information 540, for the page corresponding to the position of scrubber 520 on multi-section progress bar 518, is displayed. Page information 540 may include a description of the content in the page, a snippet of text from the page, and/or a thumbnail of the page.

Figure 5E:
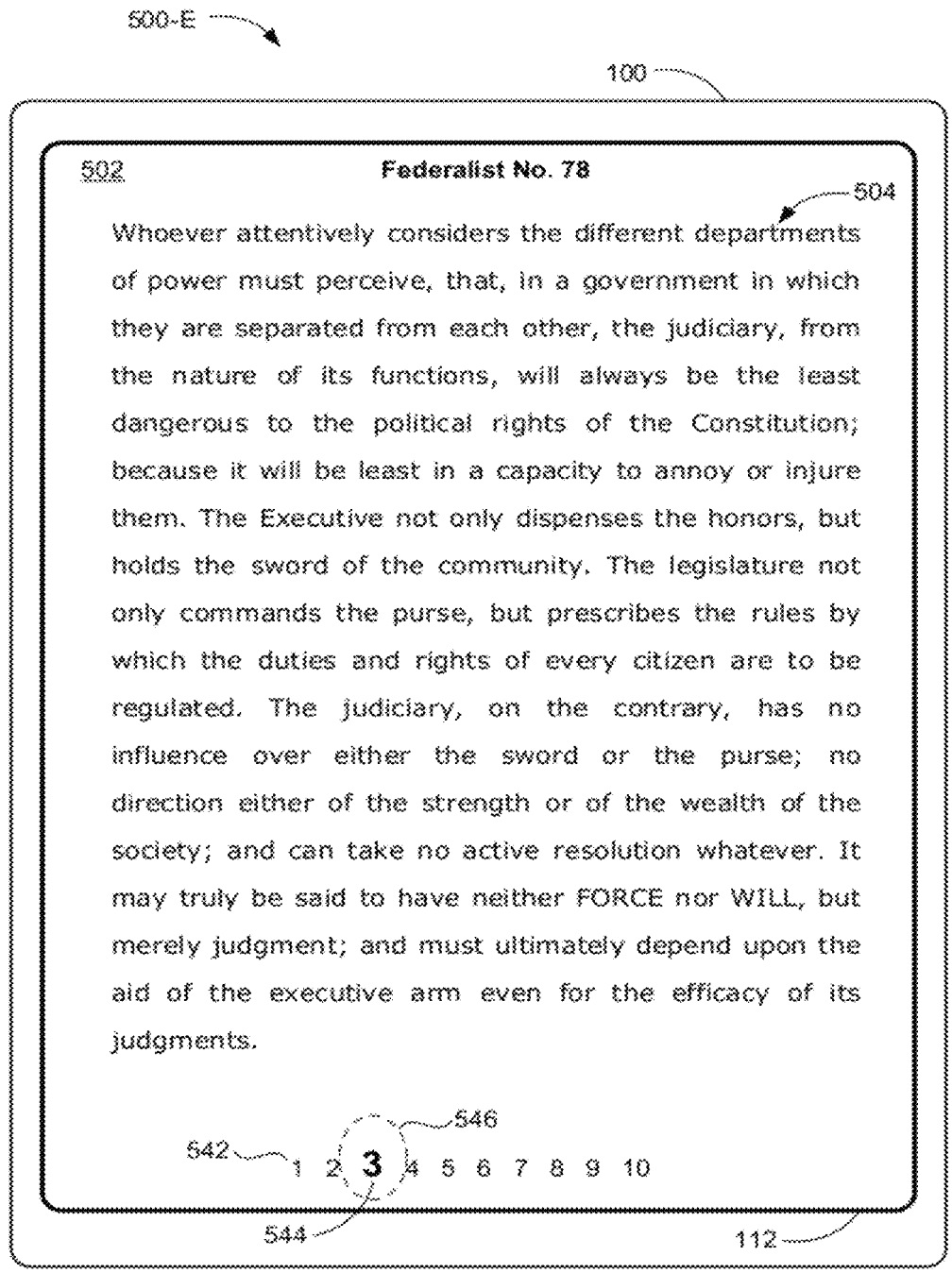

FIG. 5E illustrates UI 500-E. UI 500-E includes page 504 displayed on touch-sensitive display 112. Also displayed is a current page indicator bar 542. Current page indicator bar 542 includes page numbers corresponding to individual pages in the current section, with page number 544 for the currently displayed page highlighted (e.g., displayed in boldface, displayed in larger font size, displayed in a different color, etc.). In response to detection of a gesture (e.g., a contact sliding along current page indicator bar 542 and stopping at a location along bar 542) on a page number in current page indicator bar 542, device 100 highlights that page number (e.g., displaying that page number in boldface, etc.) in current page indicator bar 542 and, if the corresponding page is not currently displayed, navigates to and displays the corresponding page on touch-sensitive display 112. In some embodiments, current page indicator bar 542 enables navigation between pages only within the current section.

In some embodiments, current page indicator bar 542, instead of or in addition to displaying page numbers, displays thumbnails of individual pages, with the thumbnail corresponding to the currently displayed page highlighted.

FIG. 5E depicts gesture 546 being detected on current page number 544. Gesture 546 is a different gesture than a gesture for highlighting a page number in current page indicator bar 542 and navigating to the corresponding page. For example, gesture 546 is a tap and hold gesture. Gesture 546 on current page number 544 is, like gesture 514, another example of a gesture that matches a predefined gesture type on a predefined location (e.g., page number 544 corresponding to the currently displayed age). In response to detection of gesture 546 on currently page number 544, navigation interface 516 is displayed, like in FIGS. 5B and 5D described above. Detection of the predefined gesture (e.g., gesture 546) at a location other than the predefined location, or detection at the predefined location (e.g., current page number 544) of a gesture other than the predefined gesture will not activate display of navigation interface 516.

It should be appreciated that progress bar 506 and scrubber 508, progress bar 532 and scrubber 534, and current page indicator bar 542 are merely three examples of single-section navigation bars for navigating between pages within the currently displayed section. The embodiments described above and below may be applied analogously to other examples of single-section navigation bars for navigating only between pages within the current section.

FIGS. 6A-6B are flow diagrams illustrating a method 600 of navigating between document sections in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides a single-section navigation bar for fast, accurate navigation within a current section of a document and a complementary navigation interface for quickly navigating between sections in the document. The method reduces the cognitive burden on a user when navigating via imprecise gestures, thereby creating a more efficient human-machine interface. For battery-operated electronic devices, enabling a user to navigate faster and more efficiently conserves power and increases the time between battery charges.

The device displays a page of a first multi-page section of a document (e.g., a chapter, lesson, act, or other logical division of a multi-page document) and a navigation bar configured to navigate through only pages in the first multi-page section of the document (602). For example, FIG. 5A shows page 504 of a multi-page section (Federalist No. 78) of document 502 (Federalist Papers) displayed on touch-sensitive display 112. Also displayed is a navigation bar that includes progress bar 506 and scrubber 508 for navigating within just the current section. Another example of navigation bar is current page indicator bar 542 in FIG. 5E.

The device detects a predefined gesture at a location on the touch-sensitive surface that corresponds to a predefined portion of the navigation bar (604). For example, in FIG. 5A, predefined gesture 514 is detected at a predefined location of the navigation bar, namely at scrubber 508. As another example, FIG. 5C shows predefined gesture 536 detected on end icon 510-B of the navigation bar.

In some embodiments, the predefined gesture is one of: a tap and hold gesture, a single tap gesture, or a double tap gesture (606). For example, gesture 514 (FIG. 5A) is a single tap gesture, gesture 536 (FIG. 5C) is a double tap gesture, and gesture 546 (FIG. 5E) is a tap and hold gesture.

In some embodiments, the predefined portion of the navigation bar is a progress indicator (e.g., thumb, slider, scrubber, etc.) of the navigation bar (608). For example, the navigation bar in FIG. 5A includes scrubber 508 that indicates progress on progress bar 506. In some embodiments, a different gesture (e.g., a drag gesture or a tap and drag gesture) on the progress indicator would cause the electronic device to scrub through the first multi-page section.

In some embodiments, the predefined portion of the navigation bar is an end of the navigation bar (610). For example, in FIG. 5C, end icons 510 serve as the predefined location for gesture 536. In some embodiments, a different gesture (e.g., a single tap gesture when the predefined gesture is a double tap gesture) on an end of the navigation bar would cause the electronic device to navigate through the first multi-page section by a predefined amount (e.g., advance by one page or go backwards by one page).

In some embodiments, the predefined portion of the navigation bar is a current page indicator on the navigation bar (612). In some embodiments, the navigation bar includes page indicators for a plurality of pages in the first multi-page section and the current page indicator is visually distinguished (e.g., enlarged, in bold, displayed in a different color than the other page indicators, or otherwise visually highlighted).

In response to detecting the predefined gesture, the device displays a navigation user interface that enables selection of a page of the document that is outside of the first multi-page section (e.g., a page in another chapter of the document) (614). For example, in FIGS. 5A-5B, in response to detection of gesture 514 on scrubber 508, navigation interface 516, which includes, for example, multi-section progress bar 518 and scrubber 520, is displayed.

The device receives an input in the navigation user interface that indicates selection of a page of a second multi-page section of the document outside of the first multi-page section (e.g., a page in a second chapter of the document) (616). For example, in FIG. 5B, gesture 526 is received, which drags scrubber 520 to a position on multi-section progress bar 518 that corresponds to a page in a different section (Federalist No. 81).

In some embodiments, the navigation user interface includes a text entry box for entering a page number corresponding to the page of the second multi-page section (618). For example, navigation user interface also includes page number field 522 for entering a page number corresponding to a page in any of multiple sections of document 502.

In some embodiments, the navigation user interface includes representations (e.g., text descriptions, thumbnails, etc.) of one or more sections of the document outside of the first multi-page section (620). For example, in FIG. 5B, section information 528 is displayed in navigation interface 516. In some embodiments, a representation of the first multi-page section is also included.

In some embodiments, the navigation user interface includes representations (e.g., text descriptions, thumbnails, etc.) of one or more pages of the document outside of the first multi-page section (622). For example, in FIG. 5D, page information 540 is displayed in navigation interface 516. In some embodiments, representations of pages in the first multi-page section are also included.

In response to receiving the input, the device displays the selected page of the second multi-page section of the document. (e.g., navigating to the page in the second chapter of the document) (624). For example, in FIGS. 5B-5C, in response to detection of gesture 526 dragging scrubber 520, page 530 in Federalist No. 81 (a different section than Federalist No. 78 for page 504) is displayed.

In some embodiments, in response to receiving the input, the device ceases to display the page of the first multi-page section (626). For example, in FIGS. 5B-5C, in response to detection of gesture 526 on scrubber 520, page 504 ceases to be displayed as page 530 is displayed.

In some embodiments, in response to receiving the input, the device displays (in conjunction with displaying the selected page of the second multi-page section of the document) a navigation bar for navigating through only pages of the second multi-page section of the document (628). For example, in FIG. 5C, a navigation bar that includes progress bar 532 and scrubber 534 is displayed. The navigation bar that includes progress bar 532 and scrubber 534 is just for navigating through the pages in Federalist No. 81. It should be understood that, in some embodiments, the navigation bar for navigating through only pages of the second multi-page section of the document has analogous characteristics to the previously displayed navigation bar for navigating through only pages of the first multi-page section of the document. For example, in response to detecting the predefined gesture on the navigation bar for navigating through only pages of the second multi-page section of the document, the electronic device displays a navigation user interface that enables selection of a page of the document that is outside of the second multi-page section of the document (e.g., in the first multi-page section or in a third section).

Figure 7:
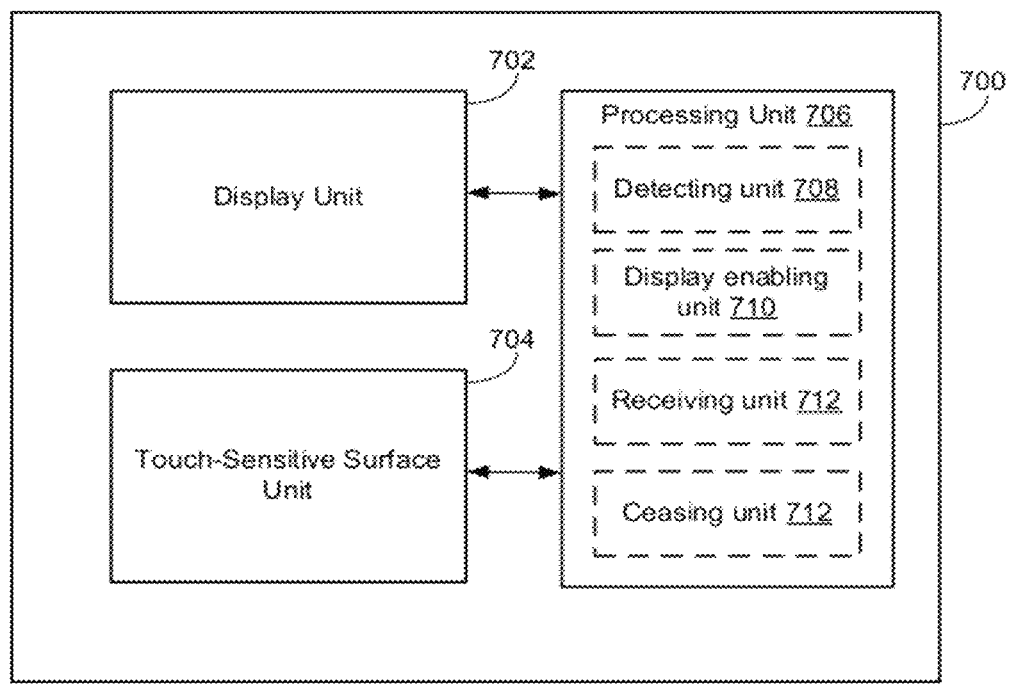
FIG. 7 is a functional block diagram of an electronic device in accordance with some embodiments.

In accordance with some embodiments, FIG. 7 shows a functional block diagram of an electronic device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, an electronic device 700 includes a display unit 702 configured to display a page of a first multi-page section of a document and a navigation bar configured to navigate through only pages in the first multi-page section of the document; a touch-sensitive surface unit 704 configured to receive user gestures; and a processing unit 706 coupled to the display unit 702 and the touch-sensitive surface unit 704. In some embodiments, the processing unit 706 includes a detecting unit 708, a display enabling unit 710, a receiving unit 712, and a ceasing unit 714.

The processing unit 706 is configured to: detect a predefined gesture at a location on the touch-sensitive surface unit 704 that corresponds to a predefined portion of the navigation bar (e.g., with the detecting unit 708); in response to detecting the predefined gesture, enable display of a navigation user interface that enables selection of a page of the document that is outside of the first multi-page section (e.g., with the display enabling unit 710); receive an input in the navigation user interface that indicates selection of a page of a second multi-page section of the document outside of the first multi-page section (e.g., with the receiving unit 712); and in response to receiving the input, enable display of the selected page of the second multi-page section of the document (e.g., with the display enabling unit 710).

In some embodiments, the processing unit 706 is configured to: in response to receiving the input, cease to display the page of the first multi-page section (e.g., with the ceasing unit 714).

In some embodiments, the processing unit 706 is configured to: in response to receiving the input, enable display of a navigation bar for navigating through only pages of the second multi-page section of the document (e.g., with the display enabling unit 710).

In some embodiments, the predefined gesture is one of: a tap and hold gesture, a single tap gesture, or a double tap gesture.

In some embodiments, the predefined portion of the navigation bar is a progress indicator of the navigation bar.

In some embodiments, the predefined portion of the navigation bar is an end of the navigation bar.

In some embodiments, the predefined portion of the navigation bar is a current page indicator on the navigation bar.

In some embodiments, the navigation user interface includes a text entry box for entering a page number corresponding to the page of the second multi-page section.

In some embodiments, the navigation user interface includes representations of one or more sections of the document outside of the first multi-page section.

In some embodiments, the navigation user interface includes representations of one or more pages of the document outside of the first multi-page section.

The operations described above with reference to FIGS. 6A-6B may be implemented by components depicted in FIGS. 1A-1B. For example, detection operation 604, displaying operations 614 and 624, and receiving operation 616 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a page of a first multi-page section of a document and a section navigation bar configured to navigate through only pages in the first multi-page section of the document, wherein the document includes a plurality of multi-page sections between a beginning of the document and an end of the document;
detecting a predefined gesture at a location on the touch-sensitive surface that corresponds to a predefined portion of the section navigation bar;
in response to detecting the predefined gesture, displaying a document navigation user interface that enables selection of a page of the document that is outside of the first multipage section, wherein the document navigation user interface is distinct and separate from the section navigation bar, wherein the document navigation user interface was not displayed immediately prior to detecting the predefined gesture;
receiving an input in the document navigation user interface that indicates selection of a page of a second multi-page section of the document outside of the first multi-page section; and
in response to receiving the input, displaying the selected page of the second multipage section of the document.

2. The device of claim 1, including instructions for, in response to receiving the input, ceasing to display the page of the first multi-page section.

3. The device of claim 1, including instructions for, in response to receiving the input, displaying a section navigation bar for navigating through only pages of the second multi-page section of the document.

4. The device of claim 1, wherein the predefined gesture is one of: a tap and hold gesture, a single tap gesture, or a double tap gesture.

5. The device of claim 1, wherein the predefined portion of the section navigation bar is a progress indicator of the section navigation bar.

6. The device of claim 1, wherein the predefined portion of the section navigation bar is an end of the section navigation bar.

7. The device of claim 1, wherein the predefined portion of the section navigation bar is a current page indicator on the section navigation bar.

8. The device of claim 1, wherein the document navigation user interface includes a text entry box for entering a page number corresponding to the page of the second multi-page section.

9. The device of claim 1, wherein the document navigation user interface includes representations of one or more sections of the document outside of the first multi-page section.

10. The device of claim 1, wherein the document navigation user interface includes representations of one or more pages of the document outside of the first multi-page section.

11. A method, comprising: at an electronic device having a display and a touch-sensitive surface:
displaying a page of a first multi-page section of a document and a section navigation bar configured to navigate through only pages in the first multi-page section of the document, wherein the document includes a plurality of multi-page sections between a beginning of the document and an end of the document;
detecting a predefined gesture at a location on the touch-sensitive surface that corresponds to a predefined portion of the section navigation bar;
in response to detecting the predefined gesture, displaying a navigation user interface that enables selection of a page of the document that is outside of the first multipage section, wherein the document navigation user interface is distinct and separate from the section navigation bar, wherein the document navigation user interface was not displayed immediately prior to detecting the predefined gesture;
receiving an input in the document navigation user interface that indicates selection of a page of a second multi-page section of the document outside of the first multi-page section; and
in response to receiving the input, displaying the selected page of the second multi-page section of the document.

12. A graphical user interface on an electronic device with a display, a touch-sensitive surface, a memory, and one or more processors to execute one or more programs stored in the memory, the graphical user interface comprising:
a page of a first multi-page section of a document and a section navigation bar configured to navigate through only pages in the first multi-page section of the document, wherein the document includes a plurality of multi-page sections between a beginning of the document and an end of the document;
wherein:
a predefined gesture is detected at a location on the touch-sensitive surface that corresponds to a predefined portion of the section navigation bar;
in response to detecting the predefined gesture, a document navigation user interface that enables selection of a page of the document that is outside of the first multi-page section is displayed, wherein the document navigation user interface is distinct and separate from the section navigation bar, wherein the document navigation user interface was not displayed immediately prior to detecting the predefined gesture;
an input that indicates selection of a page of a second multi-page section of the document outside of the first multi-page section is received in the document navigation user interface; and
in response to receiving the input, the selected page of the second multi-page section of the document is displayed.

13. A non-transitory computer readable storage medium storing one or more programs, the one or more programs comprising instructions, which when executed by an electronic device with a display and a touch-sensitive surface, cause the device to:
display a page of a first multi-page section of a document and a section navigation bar configured to navigate through only pages in the first multi-page section of the document, wherein the document includes a plurality of multi-page sections between a beginning of the document and an end of the document;

detect a predefined gesture at a location on the touch-sensitive surface that corresponds to a predefined portion of the section navigation bar;

in response to detecting the predefined gesture, display a document navigation user interface that enables selection of a page of the document that is outside of the first multi-page section, wherein the document navigation user interface is distinct and separate from the section navigation bar, wherein the document navigation user interface was not displayed immediately prior to detecting the predefined gesture;

receive an input in the document navigation user interface that indicates selection of a page of a second multi-page section of the document outside of the first multi-page section; and in response to receiving the input, display the selected page of the second multi-page section of the document.

* * * * *